(12) United States Patent  (10) Patent No.: US 8,118,438 B2
Daniel et al.  (45) Date of Patent: Feb. 21, 2012

(54) METHOD AND APPARATUS FOR REAL-TIME PROJECTION ONTO AN OBJECT OF DATA OBTAINED FROM 3-D MEASUREMENT

(75) Inventors: Yitzhak Daniel, Givat Ze'ev (IL);
Kalman Wilner, Ramat-Gan (IL);
Freddy Paz, Jerusalem (IL)

(73) Assignee: Optimet, Optical Metrology Ltd., Jerusalem (IL)

( * ) Notice: Subject to any disclaimer, the term of this patent is extended or adjusted under 35 U.S.C. 154(b) by 342 days.

(21) Appl. No.: 12/508,848

(22) Filed: Jul. 24, 2009

(65) Prior Publication Data

US 2011/0019155 A1  Jan. 27, 2011

(51) Int. Cl.
*G03B 21/00* (2006.01)

(52) U.S. Cl. ............ 353/122; 353/5; 353/6; 353/7; 353/30; 353/31; 353/40; 353/41; 353/44; 353/45; 353/49; 353/69; 353/70; 353/119; 353/121

(58) Field of Classification Search .......... 353/5, 6, 353/7, 30, 31, 40, 44, 45, 49, 119, 121, 122; 356/601–623; 433/29, 213, 215, 229; 700/97, 700/98, 178, 180, 182, 255, 419, 619, 620, 700/95; 264/113, 16, 17, 19, 219, 308, 401, 264/497

See application file for complete search history.

(56) References Cited

U.S. PATENT DOCUMENTS

| | | | |
|---|---|---|---|
| 4,575,805 A * | 3/1986 | Moermann et al. | 700/163 |
| 4,611,288 A * | 9/1986 | Duret et al. | 700/163 |
| 6,547,397 B1 | 4/2003 | Kaufman et al. | 353/28 |
| 6,808,659 B2 | 10/2004 | Schulman et al. | 264/16 |
| 7,128,420 B2 | 10/2006 | Kapellner et al. | 353/38 |
| 7,375,827 B2 | 5/2008 | Sanilevici et al. | 356/614 |
| 2004/0196435 A1 | 10/2004 | Dick et al. | 351/222 |

(Continued)

FOREIGN PATENT DOCUMENTS

WO  WO 03/005733  1/2003

(Continued)

OTHER PUBLICATIONS

Authorized Officer: Lee W. Young, International Search Report and Written Opinion; PCT/IL 10/00589, 15 pages, Dec. 4, 2010.

*Primary Examiner* — Georgia Y Epps
*Assistant Examiner* — Sultan Chowdhury
(74) *Attorney, Agent, or Firm* — Sunstein Kann Murphy & Timbers LLP

(57) ABSTRACT

Methods and apparatus for projecting a tangible image of data characterizing an object onto a surface of the object itself. Three-dimensional measurements of the object are obtained, the measurements are processed for projection, and a tangible image is projected onto the object, the image conveying information based on the three-dimensional measurements. The image may be projected concurrently with performance of measurements. In an exemplary dental context, information derived in part from three-dimensional measurements of a tooth or replica may be projected onto the actual tooth or replica. In interactive application, a work piece is be measured during the course of fabrication, and three-dimensional information, derived from contemporaneous non-contact measurement, is projected onto the work piece in order to direct the user with the formation of the work piece.

20 Claims, 7 Drawing Sheets

U.S. PATENT DOCUMENTS

| | | | |
|---|---|---|---|
| 2004/0254476 A1* | 12/2004 | Quadling et al. | 600/476 |
| 2006/0018025 A1 | 1/2006 | Sharon et al. | 359/618 |
| 2006/0279662 A1 | 12/2006 | Kapellner et al. | 348/744 |
| 2007/0003865 A1 | 1/2007 | Barr et al. | 430/270.1 |
| 2007/0047043 A1 | 3/2007 | Kapellner et al. | 359/30 |
| 2007/0172112 A1 | 7/2007 | Paley et al. | 382/154 |
| 2007/0218372 A1 | 9/2007 | Zalevsky et al. | 430/5 |
| 2007/0293769 A1 | 12/2007 | Doherty et al. | 600/476 |
| 2008/0065251 A1 | 3/2008 | Soucy | 700/98 |
| 2008/0300824 A1 | 12/2008 | Culp et al. | 702/166 |

FOREIGN PATENT DOCUMENTS

| | | |
|---|---|---|
| WO | WO 2004/064410 | 7/2004 |
| WO | WO 2004/084534 | 9/2004 |
| WO | WO 2005/010573 | 2/2005 |
| WO | WO 2005/036211 | 4/2005 |
| WO | WO 2007/060666 | 5/2007 |
| WO | WO 2008/010219 | 1/2008 |
| WO | WO 2009/010977 | 1/2009 |
| WO | WO 2009/010978 | 1/2009 |
| WO | WO 2009/040822 | 4/2009 |

* cited by examiner

METHOD AND APPARATUS FOR REAL-TIME PROJECTION ONTO AN OBJECT OF DATA OBTAINED FROM 3-D MEASUREMENT

FIELD OF THE INVENTION

The present invention relates to apparatus and methods for displaying metrological information on surfaces of measured objects in substantially real time.

BACKGROUND ART

Currently, various techniques are employed for non-contact three-dimensional measurement of items that may part of either fabrication, or any other operation upon, any manner of work piece, of which dental surfaces provide one kind of example. Techniques of this sort may use optical beams projected onto the measured object along one or more paths. An example of an apparatus and method for performing such remote metrology is provided in U.S. Pat. No. 7,375,827 (to Sanilevici et al.), and that patent is incorporated herein by reference, however that patent is provided solely by way of example, and the teachings of this invention may advantageously be applied in many other contexts. Various coordinate measuring machines (CMMs) are known in the art, and they may provide measurements of the sort to which the present teachings may advantageously be applied. More particularly, the technique of conoscopic holography allows measurement of a distance from a fiducial point in space (otherwise referred to as a "fiducial reference") to a point on the surface of an object, whereby the measurement is made along a single line of sight, which is scanned, in turn, across the object to obtain complete shape information. A mode of measurement along a line-of-sight coincident with an illuminating beam may be referred to, herein, as "coaxial." Conoscopic holography may be performed using the ConoProbe™ sensor supplied by Optimet, Optical Metrology Ltd. of Jerusalem, Israel, however, again, particular measurement apparatus and techniques are cited merely by way of example.

In the industrial field, for example, articulated measurement arms may be employed, where an optical or mechanical measurement sensors are mounted on several articulated arms that are manipulated to measure the dimensions of a physical object. During or after measurement with such a system, measurement information is processed, analyzed and presented. For example, certain critical dimensions and values may be compared against computerized drawings, and a deviation map may be presented on a PC or similar screen. Such a system is shown in FIGS. 1A and 1B.

When 3-D measurements are performed optically, the results of the measurement are typically presented on a video monitor such as a PC screen (shown in FIG. 1B), or else the results are used to govern other processes or machinery. Derivative information may also be extracted from the 3-D measurements, including such information as dimensions, distances, angles, edges, positions, deviation from a given data set, etc. Such derivative information may be presented in the form of numbers or colors. One example includes a comparison of 3-D information derived from measurement to computer-aided-design (CAD) specifications, which may be resident in computer memory or computer-readable media.

Measurement systems of the foregoing type may also be used in the context of dental restoration, where various objects bearing on restoration may be scanned in order to provide accurate 3-D information for purposes of designing and manufacturing dental restorations with computerized manufacturing machines. In the dental application of CAD/CAM processing, for example, 3-D measurements may be made of teeth in the mouth, or, alternatively, 3-D measurements may be taken of dental casts by means of a desktop scanner. One such scanner, described in detail in U.S. Pat. No. 7,375,827, is shown in FIG. 1C. In that figure, numeral 62 designates a multi-position actuator which allows bending of a laser beam into different directions, with coaxial measurements performed along each direction. A scanned work piece 60 is moved by actuators 70 relative to the illuminating beam. Intra-oral 3-D scanning of teeth and gums provides another example of 3-D metrology, and, as taught in U.S. patent application Ser. No. 12/401,668, filed Mar. 11, 2009, may be based on conoscopic holography that provides successive distance measurements coaxial with an illuminating beam.

Following measurement, either intra-orally or by means of a desktop scanner, measurement data are then typically presented on a screen and certain design steps are taken, such as marking of a crown end line, or preparation line. Marking of the preparation line may be performed in real time on a computer screen. Additional steps include design of the entire shape of the restoration, determining the insertion axis of the crown to the mouth etc. That design information then provides the basis for the fabrication of dental restorations.

One of the problems of any of the foregoing prior art 3-D metrological methods is the problem of verifying whether the measurement and the design, based on the measurement information and the user's skills, are correct in relation to the real physical object of measurement since the results are not overlaid on the real physical object. A related problem is the difficulty of reviewing, in real time, the affect that changes or modifications in the design may have during the modifications process. For example, defining the preparation line of a dental crown or bridge is based not only on measurement information but also on software algorithms and user skills. Another problem left unaddressed by methods of the prior art is to the problem of detecting where exactly on a physical object itself, does it deviate from the article as designed or from a specified dimension.

Another problematic aspect of prior art equipment and practice is that the practitioner must be attentive to the object of measurement, which may be in one field of view of the practitioner, and, at the same time, must be attentive to the monitor where the results of the measurement are being displayed, in another field of view of the practitioner. The practitioner is required to divert his attention from one place to another and without correlation between the two (and thus may also lose track of a particular position).

SUMMARY OF THE INVENTION

In accordance with preferred embodiments of the present invention, a method is provided for displaying a tangible image of metrological data on a measured object. The method has steps of:
  a. characterizing distances from the surface of the object to a fiducial reference along a plurality of distinct lines of sight;
  b. processing the distances to obtain metrological data;
  c. converting the metrological data to projection format data; and
  d. projecting the projection format data as a tangible image of the metrological data onto the surface of the measured object.

In other embodiments of the invention, converting the metrological data to projection format data may account for the three-dimensional features of the surface of the object. The step of projecting may be performed substantially concurrently with the step of characterizing distances.

In further embodiments of the invention, an identical optical beam may be used to illuminate the surface for characterizing distances as well as for projecting the projection format data. The method may have an additional step of measuring a calibration object in such a manner as to derive calibration parameters for the step of converting the metrological data to projection format data.

In alternate embodiments of the invention, there may be further steps of marking the object with a light-sensitive material and activating the light-sensitive material with light projected as part of the tangible image. The step of marking, more particularly, may include marking an end line of a dental restoration. The projection step may include projecting a design of the object onto the surface of the object, as well as projecting deviations of object measurements from a design or certain known dimension of the object. The image may be projected in one or more specified colors.

The methods taught in the present invention may be performed with respect to an object while the object is concurrently undergoing fabrication, indeed, fabrication may be directed on the basis of the tangible image of metrological data.

In accordance with another aspect of the present invention, an apparatus is provided for displaying a tangible image of metrological data directly onto the surface of an object measured by the same apparatus. The apparatus has an optical sensor for obtaining distances to the surface of the object, a processor for receiving the distances and for generating metrological data, and a projector for projecting the metrological data onto the surface of the object.

In alternate embodiments of the invention, the optical sensor may employ detection coaxial with illumination, and, more particularly, may be based on conoscopic holography. The optical sensor and the projector may be disposed within an integral housing.

In further embodiments of the invention, the projector may include a diffractive optical element and a micro-electromechanical system. The optical sensor may be an intraoral scanner. The apparatus of the invention may also have an editing tool for receiving user input in order to edit the projected processed data in real time.

BRIEF DESCRIPTION OF THE DRAWINGS

The invention will more readily be understood by reference to the following description taken with the accompanying drawings. The drawings are intended to provide a better understanding of the present invention, but are in no way intended to limit the scope of the invention.

FIG. 3A shows a measurement apparatus in accordance with the present invention, while

DETAILED DESCRIPTION OF SPECIFIC EMBODIMENTS

Figure 1A:
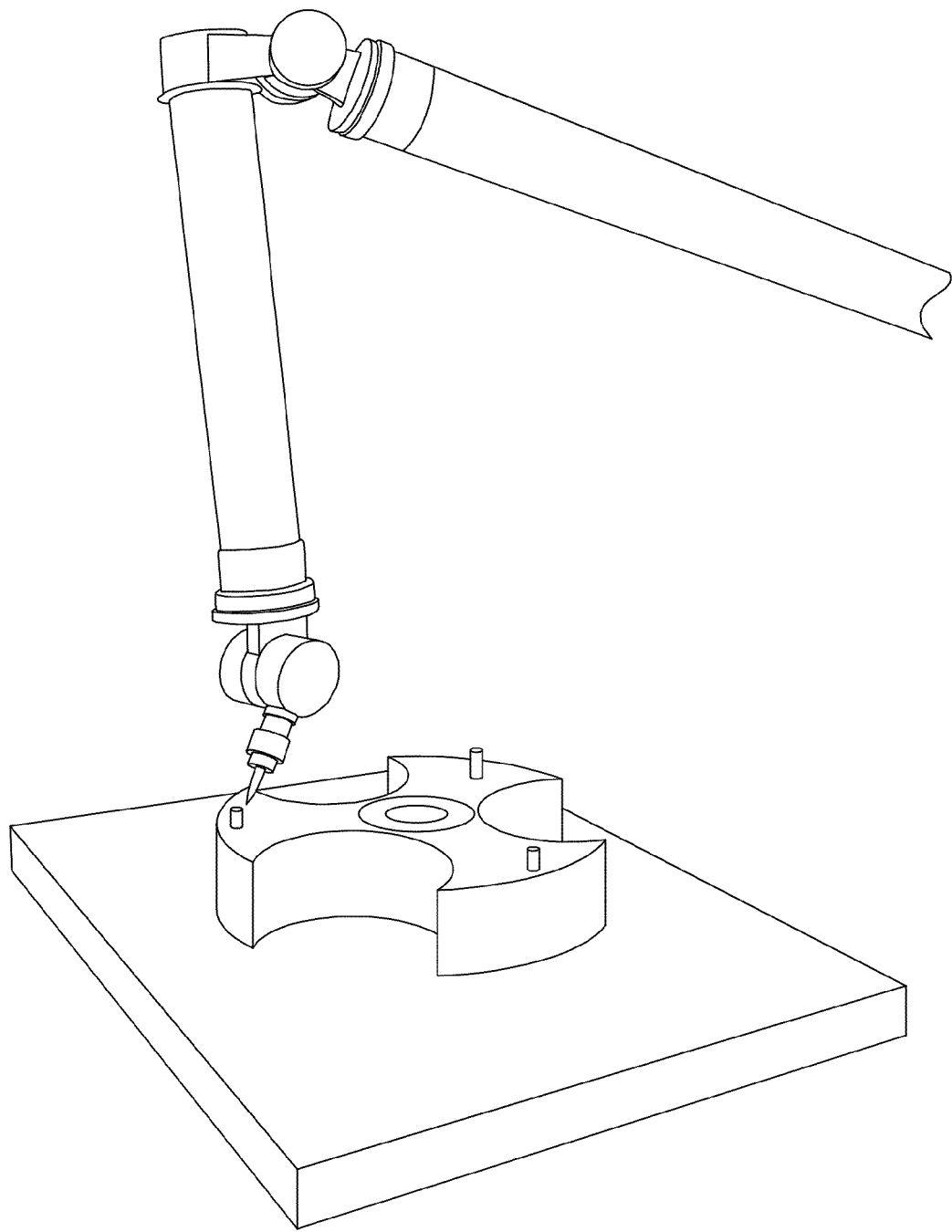
FIGS. 1A and 1B show a prior art industrial measurement system with articulated arms and a monitor for display of measurement data.

In preferred embodiments of the present invention, an apparatus and methods are provided for projecting information onto an object, such as a work piece, that is based on the three dimensional (3-D) measurement of that same object or on processing of the 3-D measurement data. The projection may advantageously be performed in real time or near real time, contemporaneously with, or shortly after, 3-D measurement of the object. The projection may be performed onto an uneven surface accounting for the shape of the surface, since that shape is, itself, measured in the performance of the invention.

One embodiment of the invention is now described with reference to a general schematic depicted in FIG. 2. A three-dimensional measurement system 50 comprises a distance measurement sensor 51, which may also be referred to herein as a 3-dimensional measurement sensor. A conoscopic coaxial probe is but one example of such a distance measurement sensor. Measurement system 50 may additionally comprise one or more actuators 52, for positioning a work piece 53 relative to the distance measurement sensor 51 along one or more axes, and a processor 54 for motion control. Processor 55 for processing measurement data, and processor 56 for design, such as computer-aided design (CAD) and analysis, are coupled to measurement system 50 either by wire or wirelessly. A single processor may fulfill the functions of processors 55 and 56.

Figure 2:
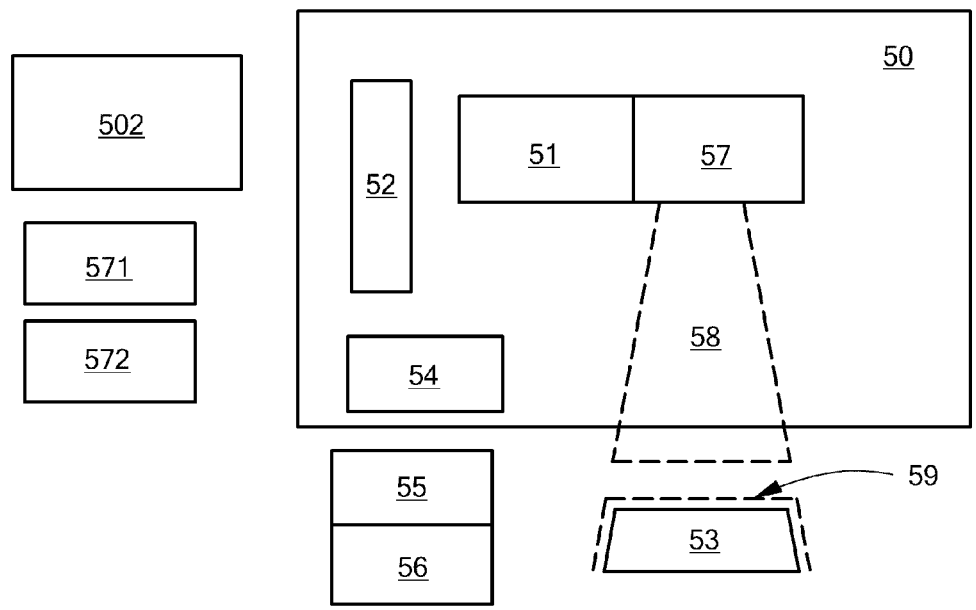
FIG. 2 is a schematic depiction of an apparatus for measurement and projection of measurement data in accordance with embodiments of the present application.

Measurement system 50 also comprises a projector 57, which, in the embodiment shown in FIG. 2, may provide a separate beam 58 from the beam used for non-contact 3-D measurement, however, in certain embodiments of the invention, the same beam may be used for both functions. A tangible image projected onto object 53 by projector 57 is designated generally by numeral 59. Processors 571 and 572 serve, respectively, for transforming the three-dimensional data derived from processor 55 to a projectable image, and for driving projector 57. Again, the functionality of processors 571 and 572 may be subsumed into a common processor that may also coincide with processor 55 or 56. Results of the 3-D measurement may, optionally, be displayed on display monitor 502.

Figure 3A:
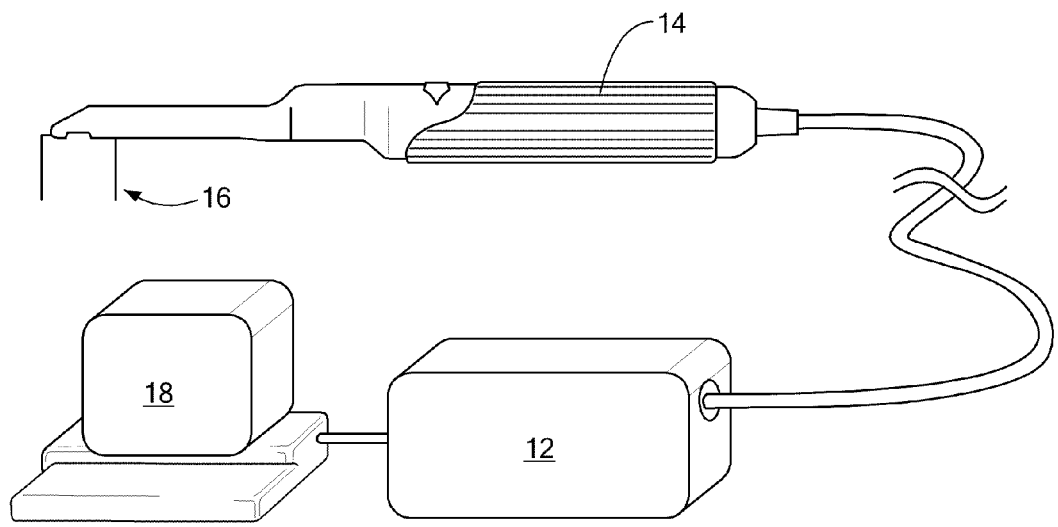
Figure 3B:
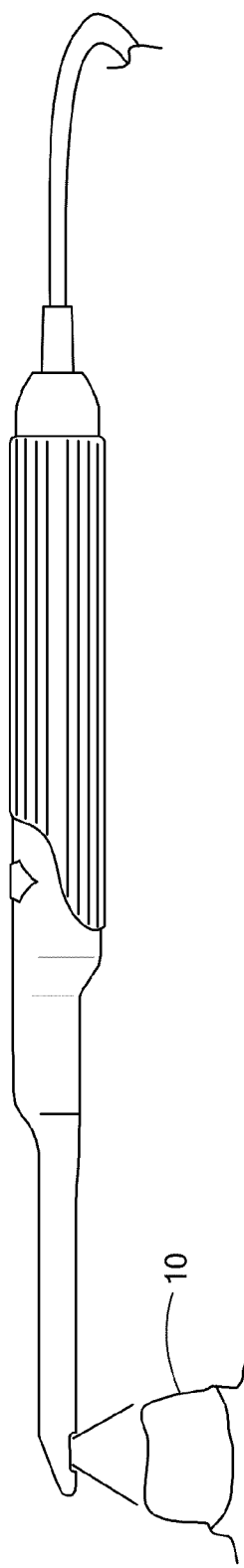
FIG. 3B shows projection of a tangible image onto a measured tooth employing teachings of the present invention.

Referring now to FIGS. 3A and 3B, projection of measurement data onto a measured object 10 is preferably performed by a dedicated integrated projection module 1 (otherwise referred to herein as a "projector") that is integrated within the measurement equipment 14 itself, where the measurement equipment shown, for example, in FIG. 3A is an intra-oral scanner. Within the scope of the present invention, the projector may be contained within a module that is distinct from the module containing the optical measuring apparatus, in which case it is aligned with the measured object in conjunction with the measuring apparatus. Projection of data onto the measured object 10 may either replace, or supplement, display on a standard screen. Digital projection may be performed onto any measured physical object made of any material. For example machined metal parts, actual teeth (in vivo), gum, dental castings, etc., may all be measured and serve a the work piece upon which embodiments of the present invention may be practiced. At the same time the projection is performed onto a measured physical object, such projection may also be done, additionally, on a standard monitor or alternative display.

Figure 4:
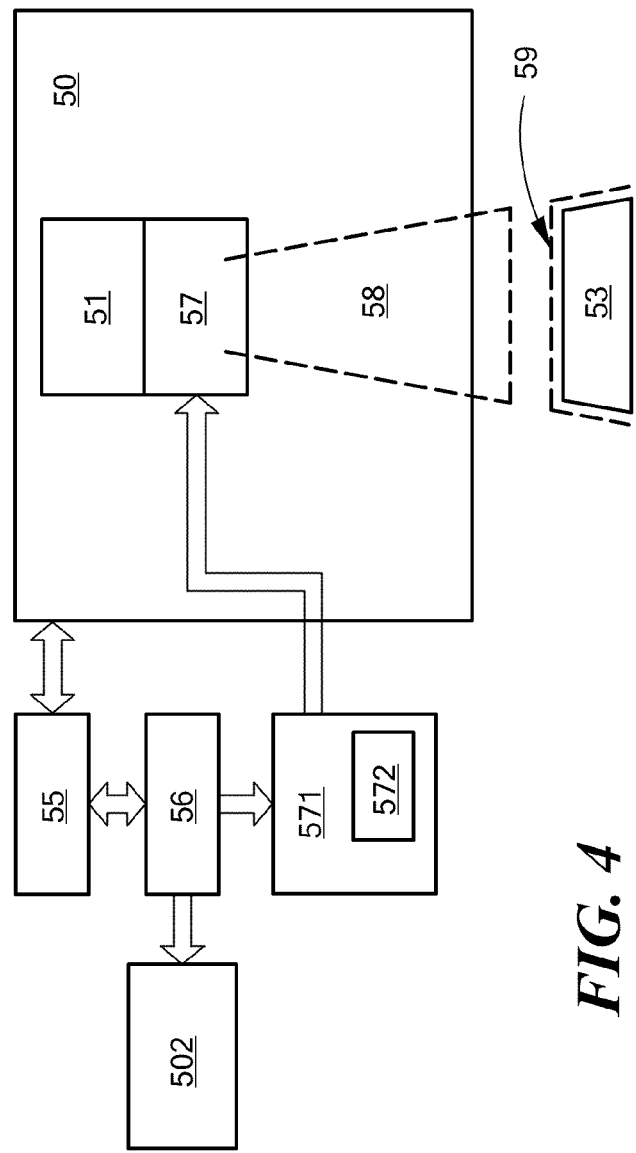
FIG. 4 shows, schematically, how information is acquired, transformed, and projected, among components of the embodiment depicted in FIG. 2.

The flow of information among components of the present invention is now discussed with reference to FIG. 4 is acquired, transformed, and projected, among components of the embodiment depicted in FIG. 2. Measurement data processor 55 governs the three-dimensional measurement system 50, and, in particular, distance measurement sensor 51. Data from data processor 55 is provided for design and analysis processing by processor 56, whose data, in turn, may be output to display 502, and is also supplied to processor 571. Processor 571 processes the measurement data, transforming it, accounting for the surface of the measured object, so that it may be projected by projector 57. In particular, processor 572 supplies data for driving projector 57. The projected data accounts in real time for the three-dimensional structure of the measured object so that the projected image falls on the object in real coordinates. Thus, the image is corrected to avoid distortion on the object. Otherwise, the image will fall on the object in 3-D indifferent distances and angles which will lead to distortion. The projected 2D image size on the object can be controlled dynamically in terms of size and orientation and manipulated into a virtual 3D image on the measured object itself in real time.

Figure 5:
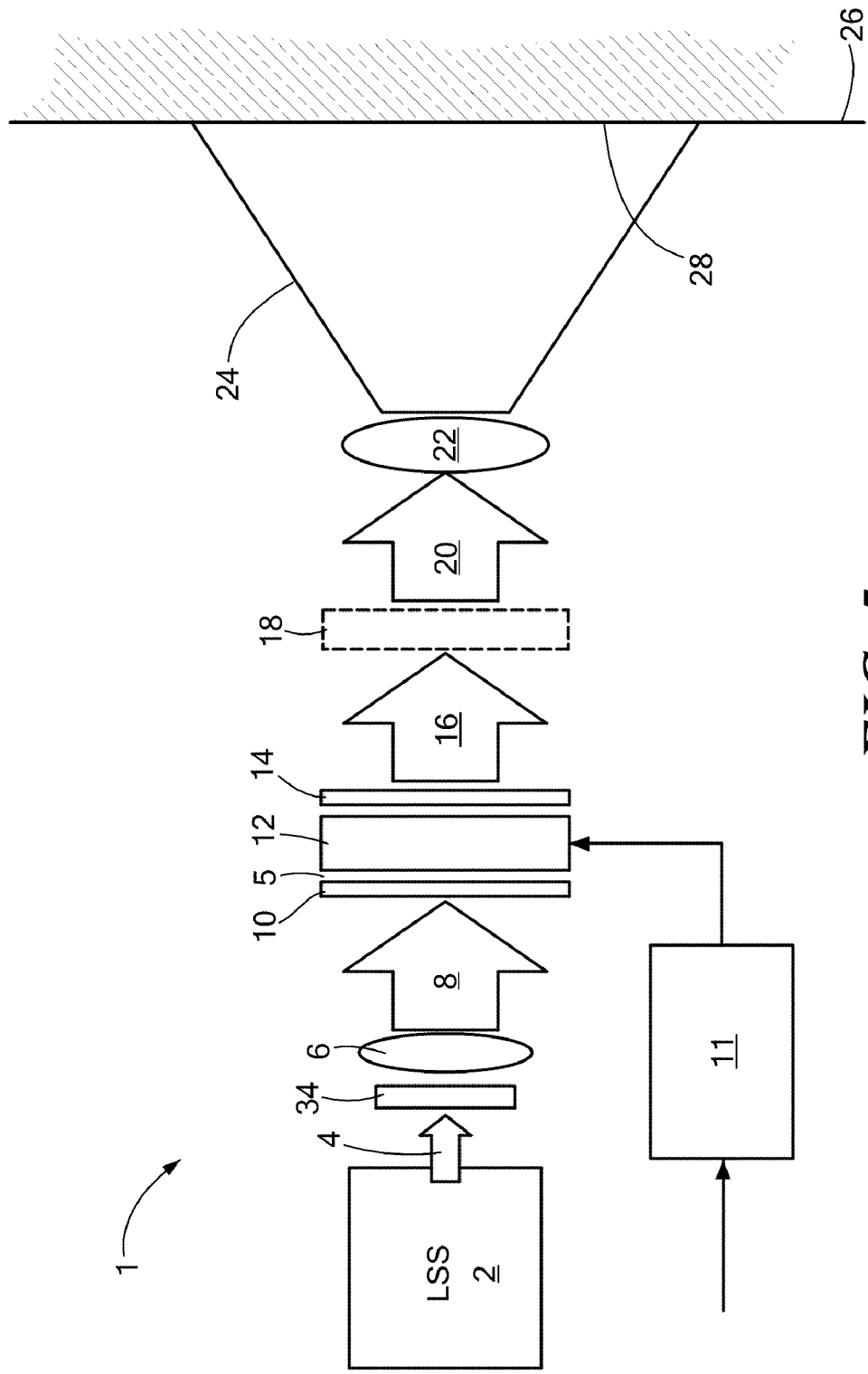
FIG. 5 is a schematic depiction of typical components of an optical projector employing a diffractive optical element, as described, for example, in Patent Publication WO 09/040822 of Explay Ltd., and one sort that may be employed in application of the present invention.

Recently developed optical components and technologies allow projection of information in high resolution by the miniaturized projection modules 1, of which one example will shortly be described with reference to FIG. 5. Optically projected imagery, including lines, figures, text, etc., is tangible, in the sense used herein: a "tangible image," as used herein and in any appended claims, refers to a visible depiction of an object or of data representing an object that is available to be apprehended by one of the human senses, typically vision.

Some projection technologies suitable for use in accordance with the present invention employ an active illumination of a micro display. In most cases reflective micro displays like Liquid Crystal on Silicon (LCoS) or Digital Micro mirror devices (DMD) based on micro electro-mechanical systems (MEMS) are used in conjuction with projection optics for projecting an image onto an object. Recently an ultra compact projection system based on a high brightness organic light-emitting diode (OLED) micro display was developed by a group in the Fraunhofer Institute for applied optics and photonic microsystems. The volume of this OLED pico projector is about 10 cm$^3$, allowing its integration into portable systems such as hand held scanners. In this particular concept an OLED micro display is the image device which emits the light by itself. Consequently an external illumination system is not necessary, advantageously allowing the entire optical projection system to be made very small.

Optical projection modules may include diffractive optics based on high-resolution, multi-layer patterns, or, more generally, spatial light modulators (SLMs). An element employing such technology is referred to, generally, as a diffractive optical element (DOE) or an optical lithography element. Such optical modules, available from Explay Ltd., Hertzlia, Israel, may provide bright, reduced-speckle and high-contrast images. Projection modules may also be based on steering of a beam using miniature mirrors driven by micro electro-mechanical systems (MEMS).

The use of SLMs for image projection is described in the following various patents and patent applications, of which the following is representative, and is incorporated by reference herein: WO 2003/005733—Kapellner et al.—An Image Projecting Device and Method. In DOE technology, a multiple-layer phase mask (rather than a binary, single-layer mask) enables the manufacture of high-resolution DOE components. For example, a cell size of 10×10 µm on a 10×10 mm element provides 1×10$^6$ resolution points. By virtue of the high focal depth of this class of device, a projected image will almost always be in focus. Multi-layer phase mask DOE technology exhibits optical efficiencies as high as 90% and a high level of uniformity of illumination.

Projection module 1 may be of a type described in detail, for example, in WO 03/005733, and depicted in FIG. 4, which is reproduced from the foregoing publication. In FIG. 4, a light source 2, which may be one or more diode-pumped solid state (DPSS) lasers, for example, generates a collimated light beam 4. Diffractive element 34 produces a substantially uniform intensity distribution across the beam 4. Beam shaping optics (beam expander) 6 matches the cross section of the beam 4 to be substantially equal to the size of an active surface defined by a pixel arrangement 5 of an SLM unit 12.

The beam 8 impinging onto the SLM pixel arrangement has a specific linear polarization. The orientation of preferred polarization of an output polarizer (analyzer) 18 is either similar to that of the incident light beam 4 or rotated by 90°, thereby blocking either the part of light that has been rotated by the SLM, or the part that has not been affected by the SLM.

SLM unit 12 comprises a two-dimensional array of active cells (e.g., liquid crystal cells) each serving as a pixel of the image and being separately operated by a modulation driver 11 to be ON or OFF and to perform the polarization rotation of light impinging thereon, thereby enabling to provide a corresponding gray level of the pixel. Some of the cells are controlled to let the light pass therethrough without a change in polarization, while others are controlled to rotate the polarization of light by certain angles, according to the input signal from the driver 11.

Beam 8 passes through a lenslet array 10 and is modulated in accordance with the image to be projected. Beam 8 may contain light combined from multiple light sources of different colors. The modulated light emerging from the SLM is collected by a second lenslet array 14, that cancels the clustering effect of the first lenslet array 10, thus producing a beam 16 having a uniform cross. Magnification optics 22 are disposed in the optical path of light emerging from the SLM unit and propagating towards a projecting surface 26. Beam 16 passes through the polarizer 18 that produces a polarized intensity modulated beam 20 indicative of an image to be projected by, the magnifying optics 22 onto surface 26. Projected image 28 stays in focus for a large variety of distances between the projector 1 and the surface 26 due to the nature of the light source and its coherence in the given optical path. Viewing quality parameters of the projection module 1 may include local or global color, saturation, relative exposure, geometrical distortions or perspective, or combinations of the foregoing.

A projector based on a diffractive optical element is preferred in the present application for various reasons. These include the miniature size of such a projector (to date, a projection module has a volume size less than 5 cm$^3$) that enables integration onto measurement devices such as a 3-D intraoral scanner or desktop 3-D scanner. The projection can be done on any type of surface due to the high light efficiency. Another quality is that the depth of focus is high and thus the projected image sensitivity to distance from the surface is low and the image stays in focus in a larger range. Thus, the micro/nano scale mask structure of the DOE device enable miniaturization of the device and the projection module to almost any desirable size and can produce any shape and configuration projected beam. Since it uses miniature laser diodes which typically have a long life span (>10,000 hours), there are no replaceable parts, thus the projection device is highly reliable.

It is preferred that the projection be as coaxial as possible with the illumination used to obtain 3-D measurements so that the 3-D data or image is projected as close as possible to the real measurement data. Indeed, an alternative and simple way for projecting the information is using the emitted laser source of the sensor itself (such a laser diode used in measurement of the optical sensors) to project and mark the information by a laser point on the object (besides its use for measurement itself) with moving the sensor by the motion of the measurement machine.

Figure 6:
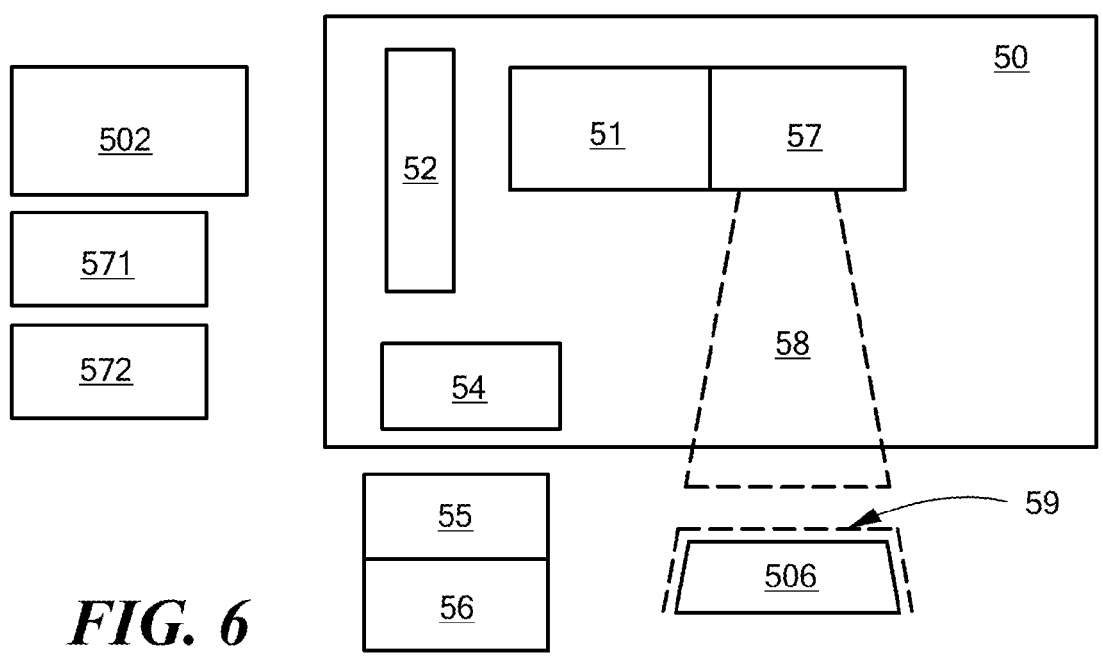
FIG. 6 depicts the calibration of an apparatus in accordance with embodiments of the present invention.

In order to provide for transformation of an image so that it may be projected as an undistorted tangible image onto the surface of a measured object, it is preferable that the apparatus be calibrated. To that end, the instrument is applied to a calibration object 506, as shown in FIG. 6, prior to application to an unknown object of measurement. Calibration object 506 has a known three-dimensional structure, such as a checkerboard with squares at different depths, to set calibration parameters for the transformation of data prior to projection onto the surface of a measured object and to confirm that the projection of data properly corresponds to known features.

The tangible projected image may include the measurement results or any processing done based on the 3-D measurement. More particularly, in a dental application, the projection may be used for any dental CAD/CAM purposes in which 3-D digital measurement is used to design and manufacture restorations.

For example, the preparation line of a crown maybe projected onto a tooth during or after the measurement, advantageously allowing a dentist or the dental technician to edit the preparation line as a result of the projection. Similarly, changes, in real time, may be made in the design of a restoration, based on projection of such information.

Examples of data derived from 3-D measurements that are usefully projected onto a dental surface in dental CAD/CAM include:
A preparation line or end line of the restoration.
Indicative information on the preparation quality (fractured prep line, undesirable undercuts etc.)
Coping/crown/inlay/onlay/bridge formations.
Implant location (implant locator position).
An indication of insufficiency of data.

In accordance with alternate embodiments of the invention, the user may also mark the physical object with material, fluorescent or otherwise, that reacts with to the projection of the 3-D data. For example, in dental application, the dentist may mark the end line of the crown (preparation line) by a florescence material excited by the projected light to produce a tangible image. In this way, only if the projected preparation line falls exactly on the actual preparation line, will such a pattern will be seen.

Advantages of the projection of 3-D information on the object in accordance with the present invention include the ability to exploit real image of the 3-D data and its processing results on the object itself in a real three-dimensional view, and in real time, and based on that to view, to validate and edit the processing.

Projection may be used for any of the following:
to view the measured information on the object
to view the processing of the information on the object
to review and edit if needed the processing result on the object.
to validate the coverage of the measurement on the object.
to validate the position of the measurement sensor with respect to range and angle relative to the object.

In accordance with embodiments of the present invention, projected information may include signs such as points, grids, coordinates, lines, numbers, angles, different colors, colors maps, arrows, and regions devoid of data.

Referring again to FIG. 2A, a 3-D measurement unit and sensor is designated by numeral 14. Sensor 14f measures the distances to the a surface of object 10, relative to a fiducial reference point, along varying lines of sight, as described in detail in U.S. Pat. No. 7,375,827, for example, and in references cited therein. In particular, sensor 14 may measure distances to the surface of measured object 10 relative to a fiducial reference point (not shown) by measurement coaxial with an illuminating beam 16. More particularly, sensor 14 may employ a conoscope. Measurement data from sensor 14 are received by processor 12, which may be integral with sensor 14 in a single housing. Projector 1 may similarly be mounted within the physical housing of the measurement unit.

Processor 12 receives 3-D measurement data from sensor 14 and may scale the projected image in real time such that the projected image falls on the object in real coordinates. The projected image is based on the 3-D distances to each point on the object, with the image corrected to avoid distortion on the object 10 due to varying distances of the object surface relative to the projector. Otherwise, the image will fall on the object in 3-D indifferent distances and angles which will lead to distortion. The projected 2D image size on the object may be controlled dynamically in terms of size, orientation and manipulated into a virtual 3D image on the measured object itself in real time. Additionally, an image may also be presented on monitor 18.

Figure 1B:
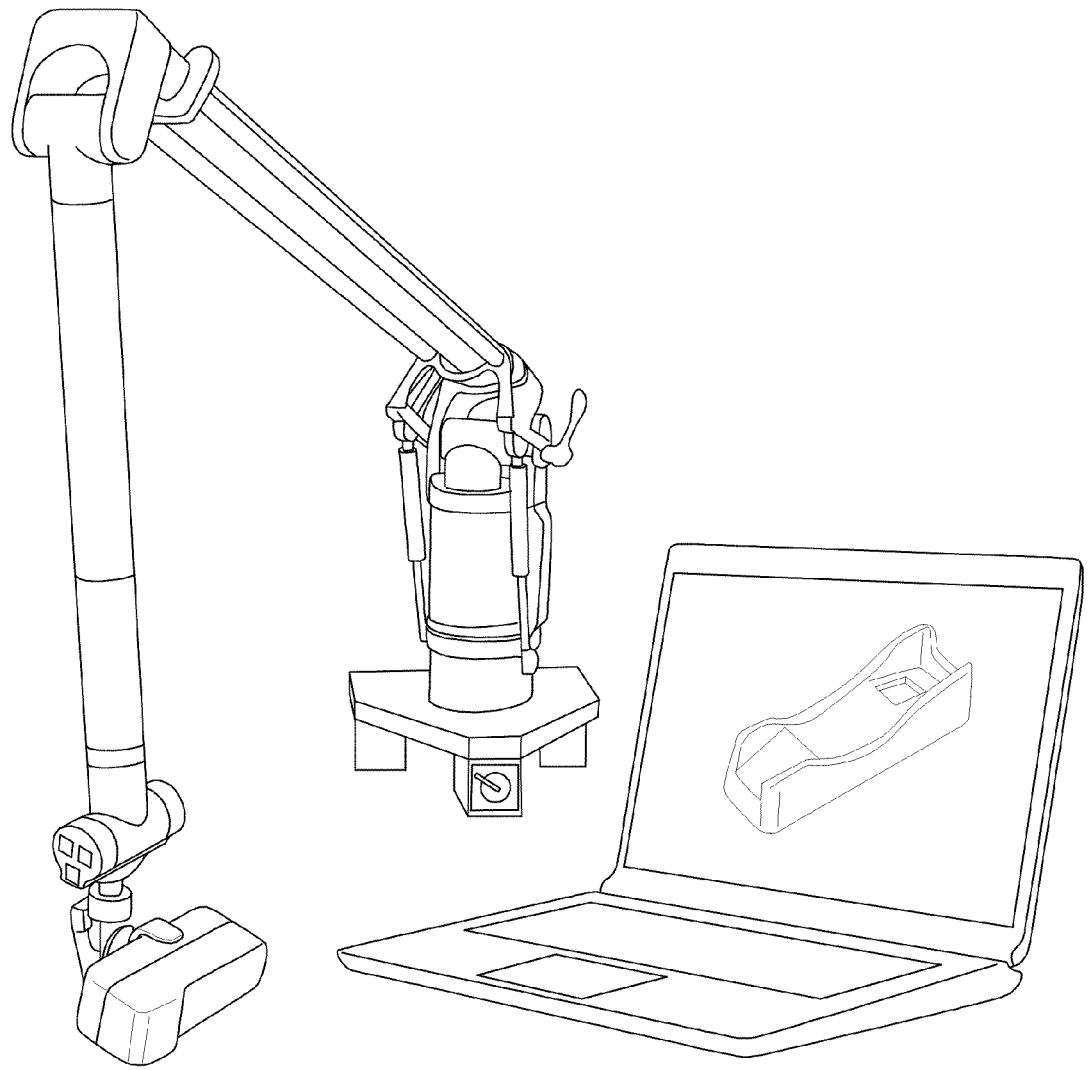
Figure 1C:
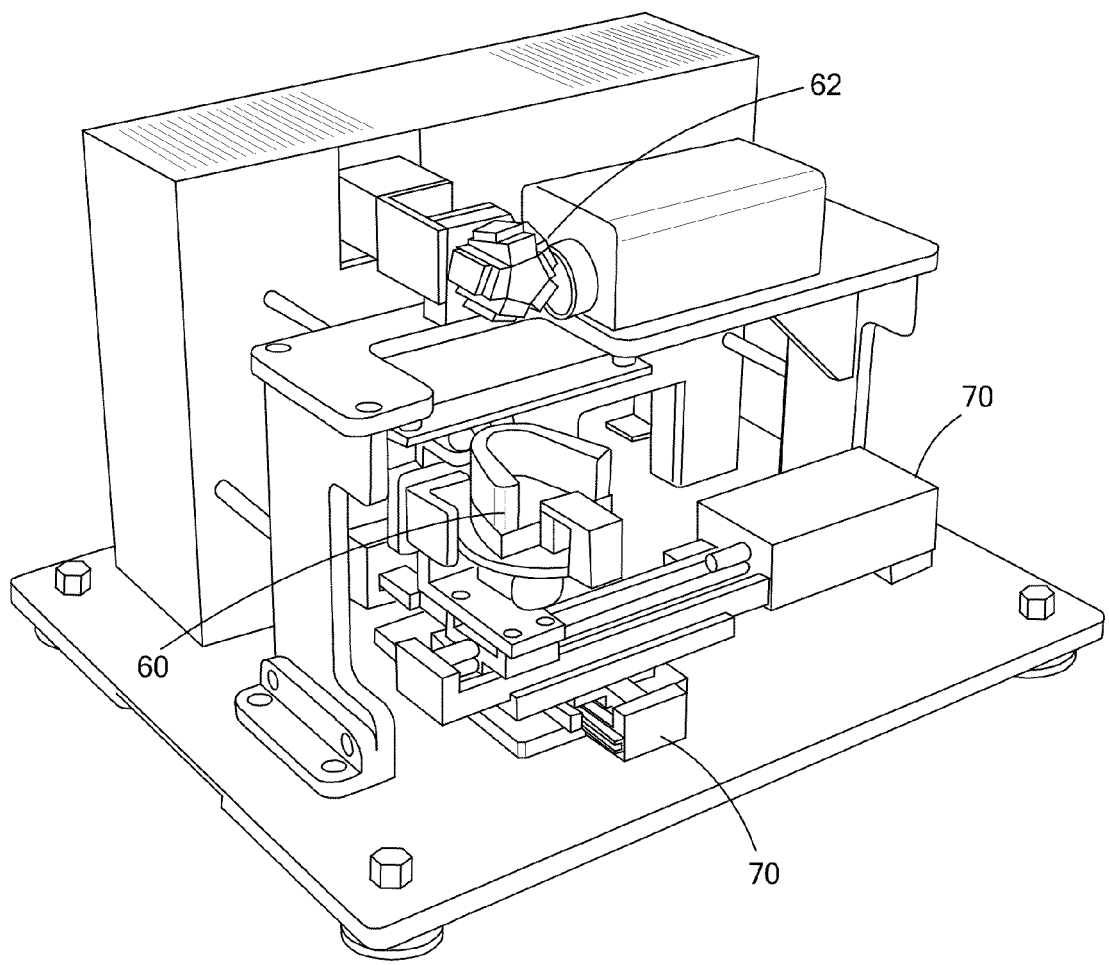
FIG. 1C is a perspective view of a prior art multiple angle scanning system, typically for dental applications.

Application of the present invention may advantageously allow a dental professional to ascertain whether a crown is properly measured and designed in terms of its position and oriented in three dimensions, and whether the intended preparation line coincides precisely with the actual preparation line and enables performing alterations in real time and viewing the results on the object itself. In another example, employing an articulated arm as depicted in FIG. 1, an operator may scan a manufactured object and concurrently view, projected onto the object itself, any deviation of the object from its drawing specifications and at the same time, the exact location of such deviation.

Figure 7A:
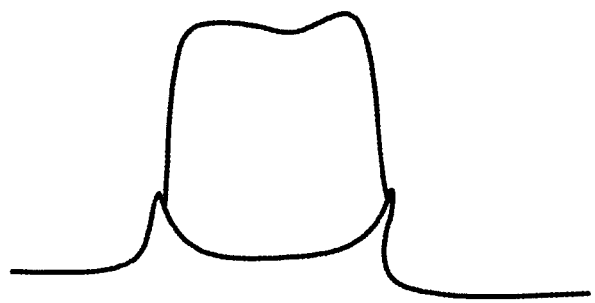
FIG. 7A represents a preparation line relative to a real tooth.
Figure 7B:
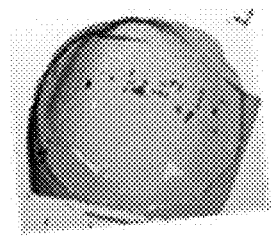
FIG. 7B shows the results of 3-D measurements as processed and imaged on a screen.
Figure 7C:
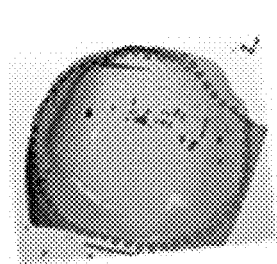
FIG. 7C shows the preparation line detected and marked digitally.
Figure 7D:
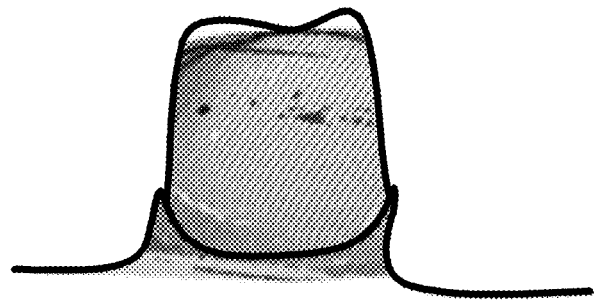
FIG. 7D shows 3-D measurement and preparation line data are projected on the actual tooth in real dimensions and in real time.

An exemplary application in the dental field may be described with reference to FIGS. 7A-7D. FIG. 7A represents a preparation line relative to a real tooth. FIG. 7B shows the results of 3-D measurements as processed and imaged on a screen. FIG. 7C shows the preparation line detected and marked digitally by the CAD software, and FIG. 7D shows 3-D measurement and preparation line data are projected on the actual tooth in real dimensions and in real time (or else, separately).

Embodiments of the present invention may be practiced in the dental field on a 3-D Intra-oral scanner (typically, in real time) or with a desktop scanner, whether in real time or not. An editing tool, such as a trackball for user input, may be added to the measurement equipment, such as an intra-oral scanner or a desktop scanner, in order to edit the design and at the same time the projected processed data, or image, in real time, using the same tool employed for measurement. Projection of the color chosen by the user for a dental crown may be projected for color match, in situ, with the color of other teeth.

In other applications of the present invention, especially in industrial applications such as articulated measurement arms, the projection of the 3-D data or image may be used for real time measurement and deviation detection, for in-range indication, measurement coverage of the object, comparison to CAD digital drawings+deviations presentation on the object itself.

In order for a projected image not be distorted by the shape of the surface on which the image is projected, it is necessary to take the three-dimensional mapping of the object into account in rendering the projection. To do so, three-dimensional measurement data must be available. Thus, in accordance with various embodiments of the invention taught herein, physical dimensions and their digital representation, formerly distinct and separated, may be rendered, in practice of the present invention, into a more combined or holistic environment, where the physical object and the digital data of the object are superimposed.

In accordance with further embodiments of the invention, an interactive procedure may be performed in which a work piece is measured while the work piece is being changed, shaped, carved, worked on, milled, or to which material is being added, etc. The work piece is measured and three-dimensional information, derived from concurrent non-contact measurement, is projected onto the work piece in order to direct the user with the formation of the work piece. This routine is interactive and may occur either in real time or iteratively. The projected information onto the work piece is used to receive feedback as to whether the current, or new, shape correlates to a certain design, pattern, desired shape, in each section or the entire work piece. The projected image may also contain information relative to deviations from the required shape or design and corrective action.

An example of the foregoing application may be found in dental reconstruction where a technician may prepare a replica of a crown or a bridge by means of some manual method. The replica is measured and information is projected onto the object in progress containing comparative information about the deviation from the required design and other information. For example, material that needs to be removed may be marked in red, while locations where material must be added may be marked in blue.

A dentist can shape a tooth or a temporary crown or a permanent one the mouth for a restoration and then measure the tooth (with an intra-oral scanner) and receive indicative information on the tooth in relation to the tooth shape and additional shaping or corrections needed or quality information about the tooth shape. The dentist can use this capability to demonstrate to a patient (or to student) what methods are being used in treatment and design and what feedback information is being obtained during the process. This can be done either with an intra-oral scanner or a desktop scanner on a replica (gypsum) master model.

In a process of diamond polishing, in accordance with another aspect of the present invention, projected information indicates where the faces deviate from a required shape or angle while the shaping and polishing process is being done.

A user may design a certain shape, using any software, place a work piece in a raw shape onto a measurement and projection system, and start shaping or sculpturing the work piece with a constant feedback on the desired shape, excess material, or area where material needs to be added.

In a surgical application of the invention, a surgeon receives 3-D information regarding an area undergoing surgery by virtue of the information being projected onto the tissue itself that is undergoing surgery. This projection is provided at the same time that measurements are performed, or soon thereafter, and may also incorporate comparative information such as 3-D scans derived from computerized tomography (CT). This allows the surgeon to be provided with precise three-dimensional information regarding the physical tissue itself and any changes that the tissue undergoes in real time, for example, as a result of the surgery.

In building accurate or complex structures, the present invention allows 3-D information to be projected directly onto the object surface during the process of building or alignment. Additionally, data may be projected directly onto an object of research or fabrication under magnification or under a microscope.

Any of the above procedures may be repeated from different angles of the object, or work piece. An example would entail repeating the procedure from the top and from the bottom of an object.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for displaying a tangible image of metrological data on a measured object having a surface characterized by three-dimensional features, the method comprising:
   a. characterizing distances from the surface of the object to a fiducial reference along a plurality of distinct lines of sight;
   b. processing the distances to obtain metrological data;
   c. converting the metrological data to projection format data; and
   d. projecting the projection format data as a tangible image of the metrological data onto the actual surface of the measured object, with the tangible image corrected based on the metrological data.

2. A method in accordance with claim 1, wherein converting the metrological data to projection format data accounts for the three-dimensional features of the surface of the object.

3. A method in accordance with claim 1, wherein the step of projecting is substantially concurrent with the step of characterizing distances.

4. A method in accordance with claim 1, wherein an identical optical beam is used to illuminate the surface for characterizing distances as well as for projecting the projection format data.

5. A method in accordance with claim 1, further comprising measuring a calibration object in such a manner as to derive calibration parameters for the step of converting the metrological data to projection format data.

6. A method in accordance with claim 1, further comprising
   a. marking the object with a light-sensitive material; and
   b. activating the light-sensitive material with light projected as part of the tangible image.

7. A method in accordance with claim 6, wherein the step of marking includes marking an end line of a dental restoration.

8. A method in accordance with claim 1, wherein the step of projecting includes projecting a design of the object onto the surface of the object.

9. A method in accordance with claim 1, wherein the step of projecting includes projecting deviations of object measurements from a design or certain known dimension of the object.

10. A method in accordance with claim 1, wherein the step of projecting includes projected an image in a specified color.

11. A method in accordance with claim 1, wherein the object is concurrently undergoing fabrication.

12. A method in accordance with claim 11, further comprising directing fabrication on the basis of the tangible image of metrological data.

13. An apparatus for displaying a tangible image of metrological data on a measured object having a surface, the apparatus comprising:
   a. an optical sensor for obtaining distances to the surface of the object;
   b. a processor for receiving the distances and for generating metrological data; and
   c. a projector for projecting the metrological data onto the actual surface of the object on the basis of the received distances such that any distortion of a projected image is corrected.

14. An apparatus in accordance with claim 13, wherein the optical sensor employs detection coaxial with illumination.

15. An apparatus in accordance with claim 13, wherein the optical sensor is a based on conoscopic holography.

16. An apparatus in accordance with claim 13, wherein the optical sensor and projector are disposed within an integral housing.

17. An apparatus in accordance with claim 13, wherein the projector includes a diffractive optical element.

18. An apparatus in accordance with claim 13, wherein the projector includes a micro-electromechanical system.

19. An apparatus in accordance with claim 13, wherein the optical sensor is an intraoral scanner.

20. An apparatus in accordance with claim 13, further comprising an editing tool for receiving user input to edit the projected processed data in real time.

* * * * *